United States Patent
Turner et al.

(10) Patent No.: US 11,919,141 B2
(45) Date of Patent: Mar. 5, 2024

(54) TOOL WITH WIRELESS SWITCH

(71) Applicant: Ingersoll-Rand Industrial U.S., Inc., Davidson, NC (US)

(72) Inventors: Scott Turner, Davidson, NC (US); Steven G. Diacumakos, Davidson, NC (US); Neal Hambleton, Davidson, NC (US); Daniel J. Becker, Monroe Township, NJ (US)

(73) Assignee: Ingersoll-Rand Industrial U.S., Inc., Davidson, NC (US)

( * ) Notice: Subject to any disclaimer, the term of this patent is extended or adjusted under 35 U.S.C. 154(b) by 919 days.

(21) Appl. No.: 16/552,227

(22) Filed: Aug. 27, 2019

(65) Prior Publication Data

US 2021/0060756 A1 Mar. 4, 2021

(51) Int. Cl.
| | |
|---|---|
| *B25F 5/02* | (2006.01) |
| *H01H 9/06* | (2006.01) |
| *H01H 13/12* | (2006.01) |
| *H01H 13/62* | (2006.01) |
| *H01H 21/54* | (2006.01) |
| *H04B 1/38* | (2015.01) |

(52) U.S. Cl.
CPC .............. *B25F 5/026* (2013.01); *H01H 9/063* (2013.01); *H01H 13/12* (2013.01); *H01H 13/62* (2013.01); *H01H 21/54* (2013.01); *H04B 1/38* (2013.01)

(58) Field of Classification Search
CPC ........ B25F 5/026; H01H 9/063; H01H 13/12; H01H 13/62; H01H 21/54; H04B 1/38
See application file for complete search history.

(56) References Cited

U.S. PATENT DOCUMENTS

| | | | |
|---|---|---|---|
| D332,736 S | 1/1993 | Mikiya | |
| 5,195,042 A * | 3/1993 | Ferraro | .............. H01R 43/0427 29/863 |
| 5,279,102 A | 1/1994 | Foster | |
| 5,638,945 A | 6/1997 | Fukinuki et al. | |
| D444,365 S | 7/2001 | Bass et al. | |
| D459,644 S | 7/2002 | Morgan | |

(Continued)

FOREIGN PATENT DOCUMENTS

| | | |
|---|---|---|
| CN | 103894990 A | 7/2014 |
| CN | 107900987 A | 4/2018 |

(Continued)

OTHER PUBLICATIONS

Alex Rennie. "The Best Air Hammers for Powering Through Your Metalworking Jobs." Popular Mechanics., Jun. 11, 2021 [online], [retrieved on Oct. 4, 2021]. Retrieved from the Internet https://www.popularmechanics.com/home/tools/g36653873/best-air-hammers/.

(Continued)

*Primary Examiner* — Andrew M Tecco
*Assistant Examiner* — Nicholas E Igbokwe
(74) *Attorney, Agent, or Firm* — Kevin E. West; Advent, LLP

(57) ABSTRACT

An electric tool is provided with a second switch that is actuated in order for the tool to be used. The second switch is on a second handle that is grasped by the operator with a different hand than the hand that actuates the main trigger switch. Communication between the second switch and the tool occurs with a wireless signal indicating that the second switch has been actuated.

21 Claims, 5 Drawing Sheets

(56) References Cited

U.S. PATENT DOCUMENTS

| | | | |
|---|---|---|---|
| D460,675 S | 7/2002 | Morgan | |
| 6,467,585 B1 | 10/2002 | Gozzo et al. | |
| D487,219 S | 3/2004 | Chudy et al. | |
| D509,119 S | 9/2005 | Schiller et al. | |
| 7,022,924 B2 | 4/2006 | Patton | |
| 7,495,584 B1* | 2/2009 | Sorensen | B60Q 1/1476 341/20 |
| 7,628,219 B2* | 12/2009 | Frauhammer | B25F 5/00 173/29 |
| D608,176 S | 1/2010 | Heidelberger | |
| 8,060,987 B1 | 11/2011 | Troudt | |
| 8,132,296 B2 | 3/2012 | Di Nicolantonio | |
| D703,020 S | 4/2014 | Zhu et al. | |
| 10,179,400 B2 | 1/2019 | Furusawa et al. | |
| D869,928 S | 12/2019 | Hsiao | |
| D894,703 S | 9/2020 | White et al. | |
| D919,088 S | 5/2021 | Fumex et al. | |
| 2003/0224729 A1* | 12/2003 | Arnold | G08C 17/02 455/39 |
| 2004/0060274 A1 | 4/2004 | Thomas et al. | |
| 2004/0163214 A1 | 8/2004 | Cheng | |
| 2005/0161241 A1 | 7/2005 | Frauhammer et al. | |
| 2005/0248303 A1 | 11/2005 | Garcia et al. | |
| 2007/0212991 A1 | 9/2007 | Izmailov | |
| 2008/0102739 A1 | 5/2008 | Sun et al. | |
| 2010/0258609 A1 | 10/2010 | Lee | |
| 2011/0114346 A1* | 5/2011 | Suzuki | B25B 23/1405 173/2 |
| 2013/0047799 A1* | 2/2013 | Gareis | B25B 23/1425 81/467 |
| 2013/0055860 A1 | 3/2013 | French | |
| 2013/0142563 A1 | 6/2013 | Sumi et al. | |
| 2013/0162188 A1* | 6/2013 | Koeder | B25F 5/026 318/434 |
| 2014/0231113 A1 | 8/2014 | Steurer | |
| 2014/0270908 A1 | 9/2014 | Hiller | |
| 2014/0366420 A1* | 12/2014 | Hager | F41A 17/46 42/70.11 |
| 2017/0174374 A1* | 6/2017 | Figiel | B65B 57/00 |
| 2017/0259446 A1* | 9/2017 | Skinner | B26D 5/086 |
| 2018/0236629 A1 | 8/2018 | Gonzalez | |
| 2018/0295584 A1 | 10/2018 | Gliner et al. | |
| 2020/0324380 A1 | 10/2020 | Brewster et al. | |
| 2020/0406443 A1 | 12/2020 | Hoffman | |

FOREIGN PATENT DOCUMENTS

| | | |
|---|---|---|
| DE | 10238710 A1 | 3/2004 |
| DE | 10347945 A1 | 5/2005 |
| DE | 102015014559 A1 | 5/2016 |
| EP | 1136188 A2 | 9/2001 |
| EP | 1302281 A1 | 4/2003 |
| EP | 2937184 A1 | 10/2015 |
| EP | 3533313 A1 | 9/2019 |
| EP | 3785862 A1 | 3/2021 |

OTHER PUBLICATIONS

Extended European Search Report for European Application No. 20192574.0, dated Nov. 19, 2020.

"Industrial Tools." Ingersoll Rand., Jul. 17, 2015 [online], [retrieved on Oct. 4, 2021]. Retrieved from the Internet URL: http://w ingersollrand.jp/pdf/tool/tool_catalog_09 .pdf.

Laura J. Wilson. "The Best Air Hammer in 2019." Best Gaming Pro., Nov. 3, 2019 [online], [retrieved on Oct. 4, 2021]. Retrieved from the Internet https://bestgamingpro.com/best-air-hammer/.

European Search Report for Application No. 21197896.0, dated Mar. 7, 2022.

Office Action in Europe for Application No. 21197896.0, dated Mar. 10, 2023.

Office Action in China for Application No. 202010870796.1, dated Jul. 28, 2023.

* cited by examiner

TOOL WITH WIRELESS SWITCH

BACKGROUND

The present inventions relate generally to electric tools and an arrangement with two switches that are actuated to operate the tool.

Numerous types of electric tools are used in assembly operations. In some cases, it is desirable for the electric tool to have two handles to operate the tool. For instance, the tool may have one handle with a trigger switch for the operator to turn the tool on and off. Where significant torque may be output from the tool, it may be desirable to have a second handle that the operator can grasp with his other hand to resist the torque output. In high torque applications and in industrial settings, it may be desirable for the operator to have both hands on the tool before the tool operates. While this has been accomplished in some electric tools with a second switch that is pressed in addition to the trigger switch in order to operate the tool, such solutions have required hard wiring between the second switch and the trigger switch. However, this is difficult to do with electric tools that have movable or removable second handles, since a wired connection between the second handle and the trigger switch would require exposed wires that flex and move with the handle, movable electric contacts between the second handle and the tool body, or some other complicated arrangement. Therefore, the inventors believe it would be desirable to provide an improved electric tool with two handles that are held by the operator when using the tool.

SUMMARY

An electric tool is described with two handles for the operator to grasp when the tool is being used. Each handle has a switch that is actuated in order for the tool to operate. One of the switches is coupled to a wireless transmitter that transmits a wireless signal when the switch is actuated. The tool has a wireless receiver that receives the wireless signal to determine when the switch has been actuated.

BRIEF DESCRIPTION OF SEVERAL VIEWS OF THE DRAWINGS

The invention may be more fully understood by reading the following description in conjunction with the drawings, in which:

FIG. 11 is an electrical schematic for the tool housing.

DETAILED DESCRIPTION

Figure 1:
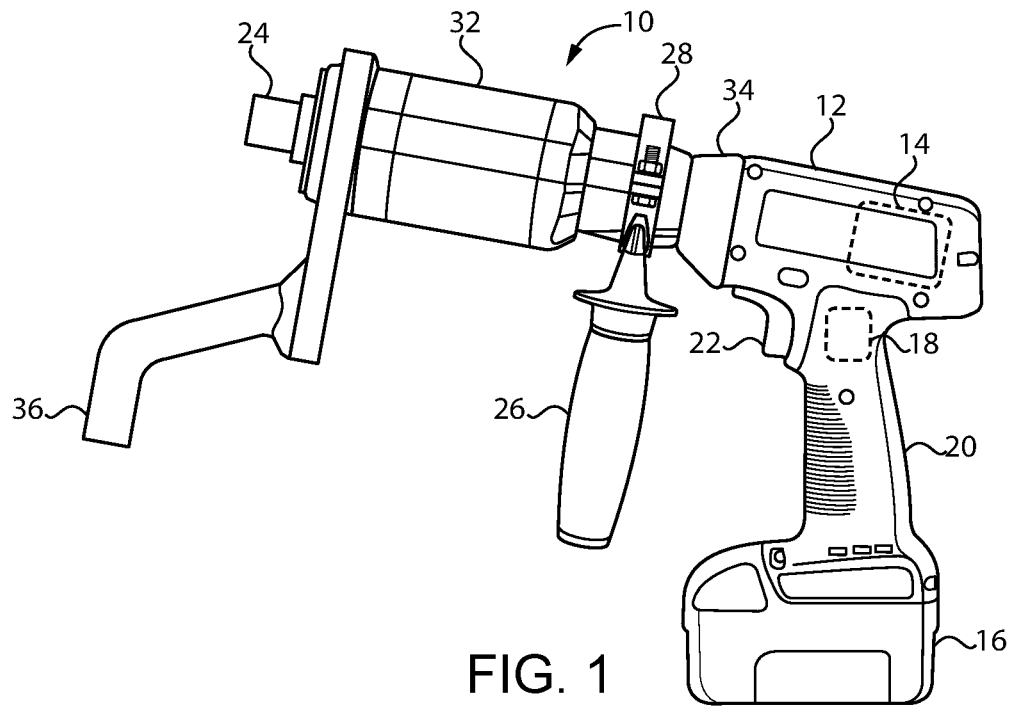
FIG. 1 is a side view of an electric tool.

Referring now to the figures, and particularly FIG. 1, an electric tool 10 is shown. Although a variety of electric tools may be used with the inventions herein, the tool 10 shown in the figures is a torque driver 10. As shown, the tool 10 has a tool housing 12 which encloses an electric motor 14. Although power may be provided by an electric cord, the tool 10 shown in FIG. 1 is a cordless tool 10 with a battery 16 that supplies power to operate the electric motor 14 and onboard control systems 18. The tool housing 12 also includes a first handle 20 that the operator grasps when using the tool 10, for example, to pick up the tool 10, move it and position it. The first handle 20 also includes a first switch 22, such as a conventional trigger switch 22 that turns the electric motor 14 on and off to produce torque at the output drive 24.

The electric tool 10 also has a second handle 26 connected to the tool housing 12. Typically, when using the tool 10, an operator will hold the first handle 20 and actuate the trigger switch 22 with one hand and will hold the second handle 26 with the other hand. The second handle 26 is useful to resist the torque output of the tool 10 in high torque applications. Preferably, the second handle 26 is movable relative to the tool housing 12 and may also be removable from the tool housing 12. For example, the handle 26 may be connected to a split clamp ring 28 that is tightened onto the front of the tool housing 12 with one or more threaded fasteners 30 in a conventional manner.

The electric tool 10 may also be provided with a torque multiplier 32 that is located past the second handle 26. That is, the second handle 26 is located between the first handle 20 and the torque multiplier 32. The torque multiplier 32 may be an optional accessory that may be connected to the output drive of a standard torque driver 34 to increase the final torque output of the tool 10. Since torque multipliers are known, only a brief description is needed. As shown, the torque multiplier 32 includes one or more gear reductions (e.g., planetary gears) that are driven by the drive output of a standard torque driver 34. The output drive 24 of the torque multiplier 32 is then connected to a threaded fastener (e.g., a nut) that is intended to be tightened.

Because of the large torque that can be output from the tool 10 with a torque multiplier 32, it may not be possible for an operator to fully resist the torque output by holding the first and second handles 20, 26 alone. Thus, it may be desirable to also provide a reaction arm 36 on the torque multiplier 32. The reaction arm 36 acts as a third handle that can be restrained to resist the torque output of the tool 10. That is, the output drive 24 rotates relative to the reaction arm 36. However, unlike the first and second handles 20, 26, the reaction arm 36 is not intended to be grasped by the operator. Instead, the reaction arm 36 is intended to be positioned against a solid feature of a workpiece when used such that the workpiece absorbs the resistance force as the fastener is being tightened by the output drive 24.

Figure 2:
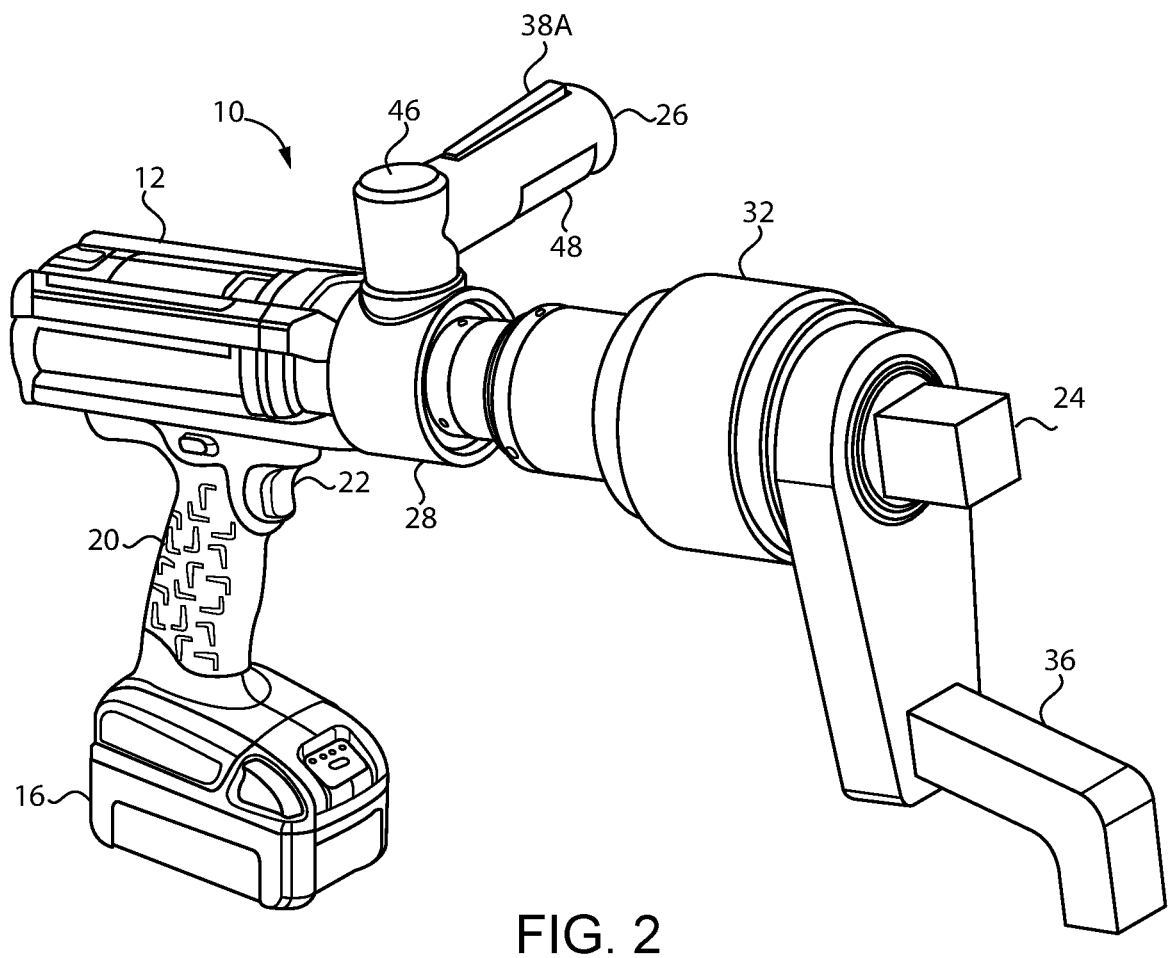
FIG. 2 is a perspective view of another electric tool.

As shown in FIG. 2, the second handle 26 may be provided with a second switch 38. In use, the electric motor 14 does not turn on to output torque from the tool 10 until both the trigger switch 22 and the second switch 38 have been actuated. Thus, in order to operate the tool, the operator places one hand on each handle 20, 26 to turn the tool 10 on. The trigger switch 22 and second switch 38 will typically be pressed buttons 22, 38 that turn off the electric motor 14 when either of the switches 22, 38 is released. Thus, the operator keeps both of his hands on the tool 10 and keeps both switches 22, 38 pressed during operation of the tool 10.

Figure 3:
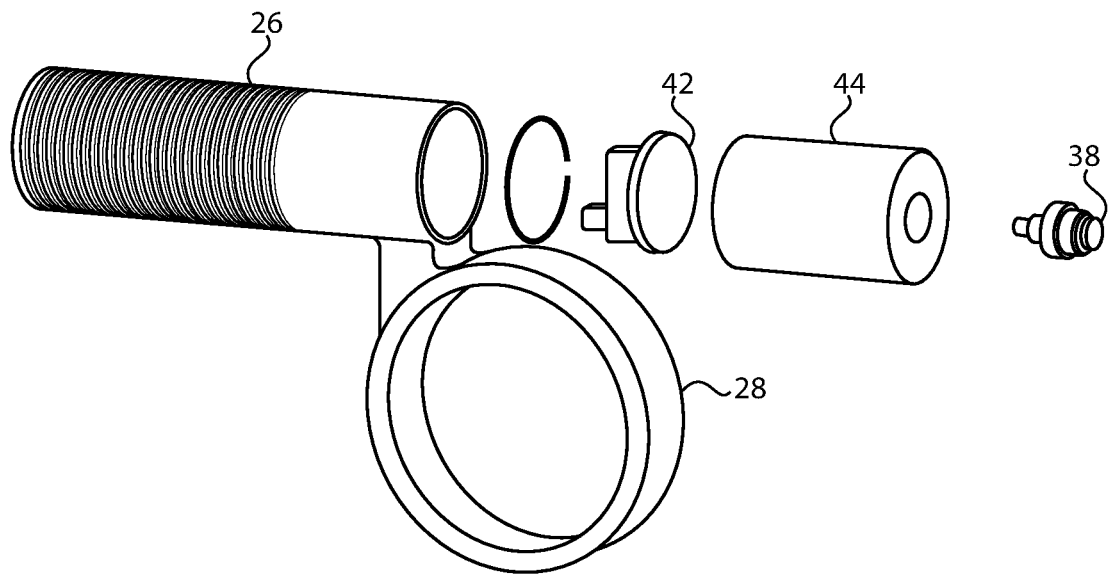
FIG. 3 is an exploded view of a second handle for the electric tool.

The second handle 26 is shown by itself in an exploded illustration in FIG. 3. As shown, the handle 26 may be connected to a clamp ring 28. For simplicity, the clamping feature is not illustrated but it is understood that the clamp ring 28 may be tightened onto the tool 10 in a desired orientation to connect the second handle 26 to the tool housing 12. The second handle 26 preferably has a cavity 40 within which a small printed circuit board 42 is enclosed. A plug 44 may be used to close the opening of the cavity 40. The second switch 38 may also be provided, which is connected to the printed circuit board 42 through an opening in the plug 44.

Figure 4:
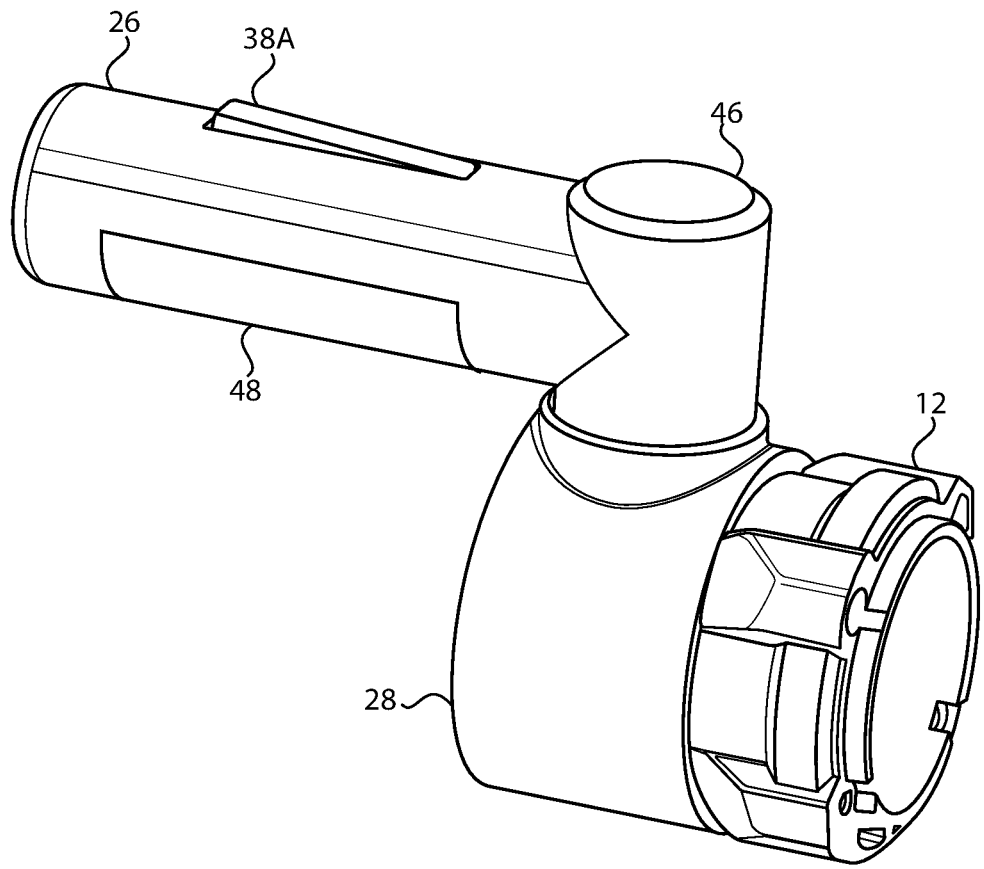
FIG. 4 is a perspective view of another second handle for the electric tool.

Another version of the second handle 26 is shown in FIG. 4. As shown, the clamp ring 28 is connected to a frontal portion of the tool housing 12. In addition to being rotatably adjustable by rotating the clamp ring 28, this version also allows the second handle 26 to pivot around a radial axis 46 to provide further customization. Also, the second switch 38 may be a hinged lever 38A that may be actuated by the operator's fingers grasping the handle 26 instead of a pushbutton 38 on the end of the handle 26 that the operator pushes with his thumb like in FIGS. 2 and 3. A battery cover 48 on the bottom side of the handle 26 is also shown.

Figure 5:
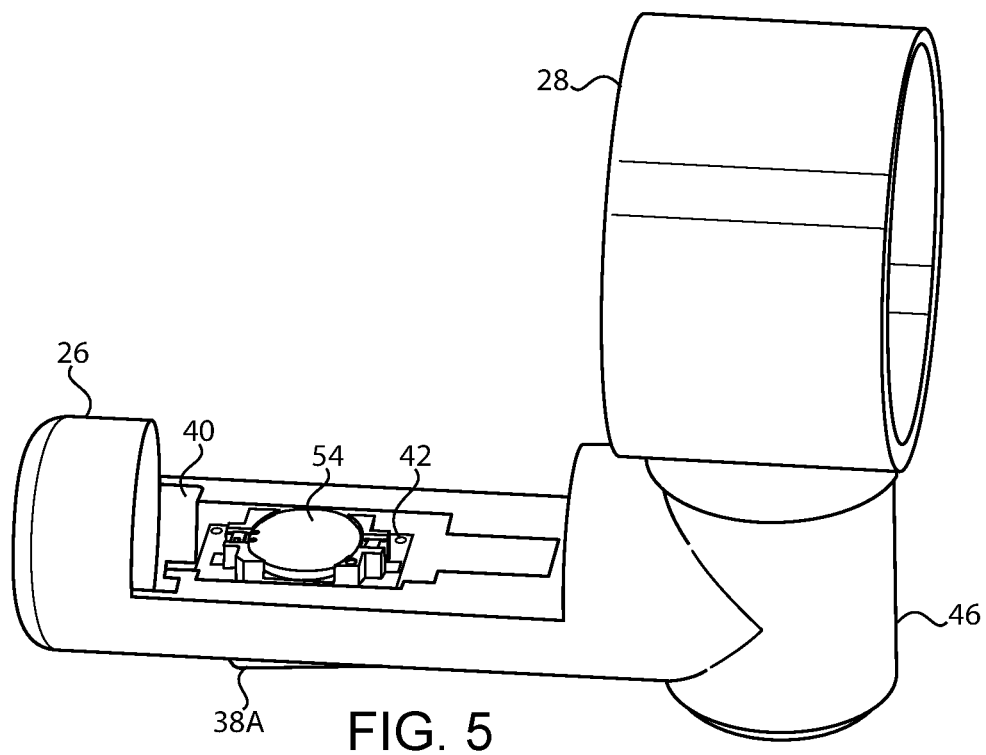
FIG. 5 is a perspective view of the second handle of FIG. 4 with a battery cover removed.
Figure 6:
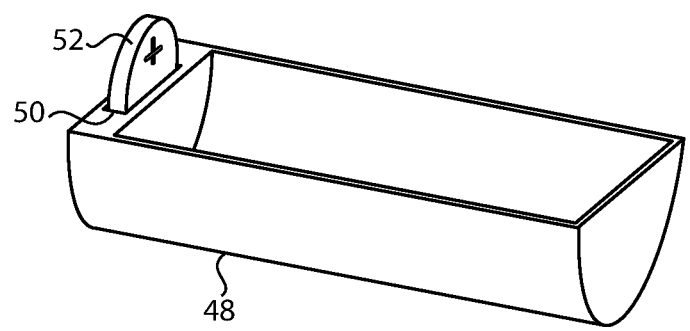
FIG. 6 is perspective view of the battery cover.
Figure 7:
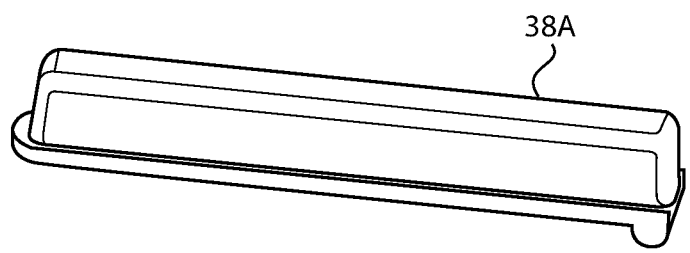
FIG. 7 is a perspective view of a second switch lever for the second handle of FIG. 4.

In FIG. 5, the battery cover 48 of the handle 26 in FIG. 4 has been removed for illustration. The battery cover 48 is shown by itself in FIG. 6. As shown, the inside of the battery cover 48 may have a slot 50 to store a spare battery 52. Referring back to FIG. 5, as with the handle 26 of FIG. 3, a printed circuit board 42 is enclosed within a cavity 40 in the handle 26. The printed circuit board 42 preferably also has a battery 54 thereon to provide power for the printed circuit board 42. Since the printed circuit board 42 operates at low power, a coin cell battery 54 may be preferred to minimize the size of the components in the handle 26 while providing sufficient battery 54 longevity. The hinged lever 38A is also shown in FIG. 7. Preferably, the hinged lever 38A is translucent to let light shine through as explained further below.

Figure 8:
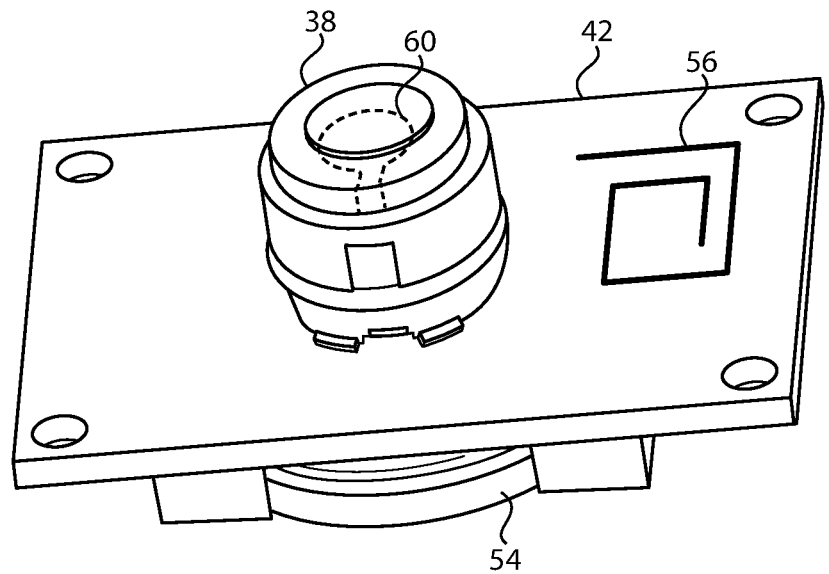
FIG. 8 is a top perspective view of a second switch for the second handle of FIG. 4.
Figure 9:
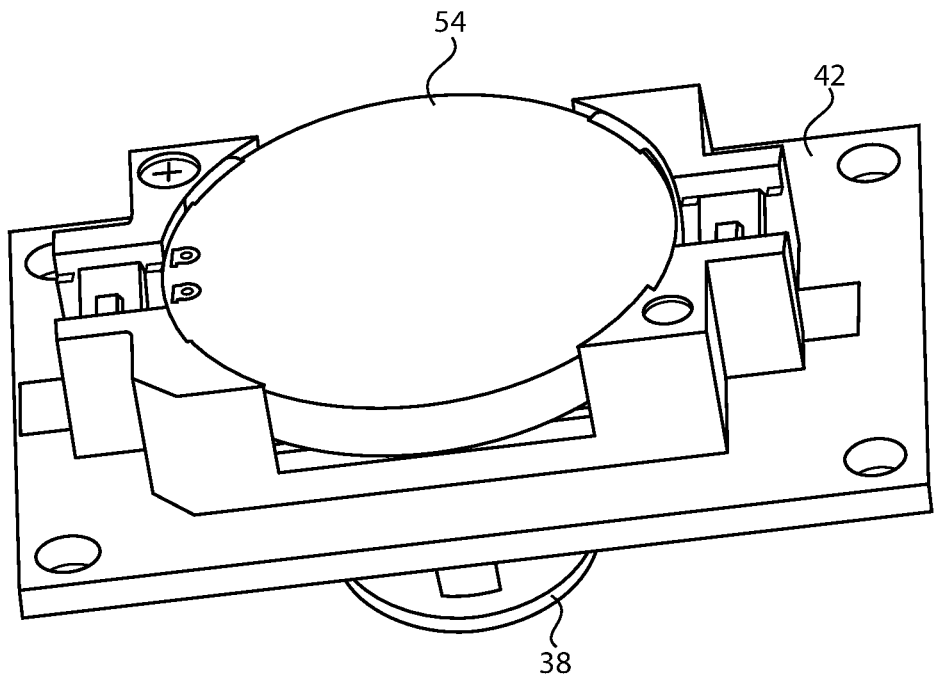
FIG. 9 is a bottom perspective view of the second switch of FIG. 8.

The printed circuit board 42 of the second handle 26 is shown in FIGS. 8-9. As shown in FIG. 8, the printed circuit board 42 has an antenna 56 to transmit a wireless signal. As explained further below, the printed circuit board 42 wirelessly communicates with the tool controller 18, or with a supervisory control system, to indicate that the second switch 38 has been actuated. Thus, the motor 14 is enabled when the trigger 22 has been pressed and when the printed circuit board 42 transmits a wireless signal indicating that the second switch 38 has been pressed. In the case where the wireless signal from the second handle 26 is received directly by the controller 18 in the tool housing 12, the transmission distance is especially short (e.g., 1-2 feet). Thus, in this arrangement the power level of the wireless transmitter 58 may be reduced to limit the transmission distance to less than 10 feet. As shown, it may be preferable for the antenna 56 of the second handle 56 to be only a conductive trace 56 on the printed circuit board 42, especially due to the short transmission distance in the case of direct communication with the controller 18 in the tool housing 12. Thus, a separate physical antenna in the second handle 26 may not be necessary. Likewise, the wireless receiver 66 in the tool housing 12 (FIG. 11) may communicate with an antenna 64 that is solely a conductive trace 64 on a printed circuit board without the need for a separate physical antenna.

It may also be desirable for the second handle 26 to include a light 60 to indicate conditions of the handle 26. For instance, the pushbutton 38 in FIG. 8 may have a light 60 (e.g., an LED 60) inside of the button 38 that illuminates when the button 38 is pushed. As shown in FIG. 5, the button 38 is positioned underneath the hinged lever 38A so that when the hinged lever 38A is pressed the pushbutton 38 is pressed by the lever 38A. Where the hinged lever 38A is translucent, the illuminated light 60 may shine therethrough to provide an external indication that the pushbutton 38 has been actuated. The light 60 also provides an indication that the printed circuit board 42 is being provided with sufficient power from the battery 54, since the battery 54 will fail to provide power to illuminate the light 60 when the battery 54 is low. Thus, the operator can easily tell when the battery 54 needs to be replaced by pressing the lever 38A and not seeing the light 60 illuminating. It is understood that the light 60 could also be used to indicate other conditions in the second handle 26 including diagnostic conditions of whether the second switch 38 is operationally functional.

Figure 10:
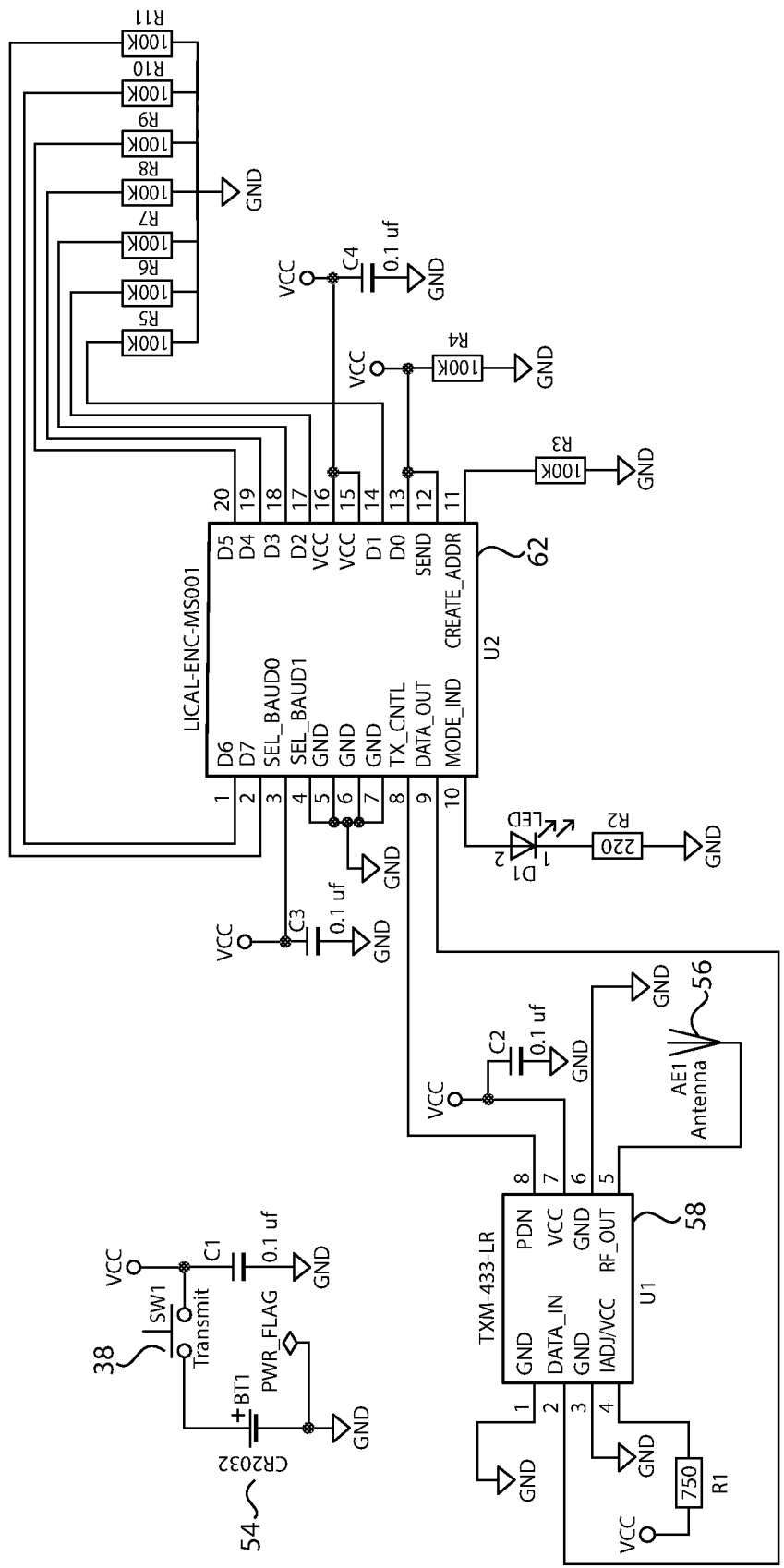
FIG. 10 is an electrical schematic for the second handle.

Circuit schematics for the second handle 26 and the tool housing 12 are shown in FIGS. 10 and 11, where FIG. 10 is a circuit schematic for the second handle 26 and FIG. 11 is a circuit schematic for the tool housing 12. It is understood that the circuit schematics may be implemented on one or more printed circuit boards (e.g., PCB 42) located within the second handle 26 and the tool housing 12, respectively. In FIG. 10, the second handle 26 includes an encoder 62 that stores a unique wireless address and data to be sent in the wireless transmission. In the present embodiment, the contents of the transmitted data is not critical and may consist of 8 bits of data that is continuously transmitted when the second switch 38 is pressed. For example, the data may be 1000 0000 defined by pins 0-7 of the encoder 62. The wireless address is preferably programmed into the encoder 62 at the factory (e.g., using pin 11) during manufacture of the tool 10 and is paired with the tool housing 12 circuit so that the tool housing 12 circuit only accepts wireless signals from the second handle 26 (or a supervisory control system). The second handle 26 also includes a wireless transmitter 58 that transmits the wireless address and data from the encoder 62 (e.g., pin 9 of encoder 62 and pin 2 of transmitter 58). The transmitter 58 transmits the wireless signal through an antenna 56. Preferably, the wireless address and data are only transmitted when the second switch 38 is pressed. Thus, in one embodiment, the second switch 38 may be coupled to the battery 54 such that power is only supplied to the encoder 62 and transmitter 58 when the second switch 38 (button 38) has been pressed. That is, when the button 38 is not pressed, no power is supplied to the encoder 62 and the transmitter 58 which prevents any wireless signal from being sent.

Turning to FIG. 11, the wireless signal is received from the second handle 26 (or supervisory control system) through an antenna 64 and receiver 66. The received address and data are then transferred to a decoder 68 that has been programmed with the unique address and expected data. When the decoder 68 receives a signal matching the expected address and data, the decoder 68 outputs an activation signal (e.g., pin 13). Another activation signal is output when the first handle 20 trigger 22 has been pressed (e.g., pin 3 of the second connector 70). Both activation signals may be supplied as inputs to a NAND (or AND) gate 72 such that a motor 14 activation signal is output if both the trigger switch 22 and second switch 38 have been pressed. The motor 14 activation signal is then sent to a DSP or other controller (e.g., through pin 3 of the first connector 74) to enable the electric motor 14. It may also be desirable to provide a mode switch 76 that disables use of the second switch 38 if that is desired. Thus, if the mode switch 76 is flipped (e.g., 1-2) the trigger 22 activation signal will bypass the NAND gate 72 and is fed directly to the motor 14 controller (e.g., pin 3 of the first connector 74). It is understood that, while the entire electronic circuitry of the second handle 26 may be represented by the schematic of FIG. 10 and may be incorporated on a single printed circuit board 42, the tool housing 12 will include additional motor 42 control circuitry and possibly other control circuitry that may be incorporated onto a single or multiple printed circuit boards. Thus, the controller 18 represented in FIG. 1 is generically drawn to illustrate all of the various control systems 18 that may be used to control the tool 10, which may include at least in part the electronics of FIG. 11. Unlike the second switch 38 which is only coupled to the tool housing 12 controller 18 through a wireless connection, the trigger switch 22, wireless receiver 66 and the controller 18 are preferably directly wired together within the tool housing 12.

Although the wireless transmission from the second handle 26 to the tool housing 12 could occur over a variety of frequencies, it is preferred for the wireless frequency to be 433 MHz (specifically 433.92 MHz) since this frequency has been set aside by many countries as an available frequency for systems such as that described herein. Thus, a frequency of 433 MHz allows a tool 10 to be used in many countries without needing to change the wireless transmission frequency.

It is understood that wireless communication between the second handle 26 and the tool housing 12 could occur in several ways. For example, as described above, the wireless receiver 66 of the tool housing 12 could receive the wireless signal directly from the wireless transmitter 58 of the second handle 26 if desired. However, it is also possible for a supervisory control system to be incorporated into the control system that enables operation of the electric motor 14 in the tool housing 12. For instance, the communication between the second handle 26 and the tool housing 12 could remain as described above, but the tool housing 12 controller 18 could also require receipt of a wireless signal from the supervisory control system granting permission to operate before enabling the motor 14. Thus, in this example, three conditions are required before the tool motor 14 can operate: trigger switch 22 being actuated, second switch 38 being actuated, and permission granted by the supervisory control system. Alternatively, the supervisory control system could intervene between the second handle 26 and the tool housing 12. In this arrangement, the second handle 26 could wirelessly communicate with the supervisory control system to indicate that the second switch 38 has been pressed instead of with the tool housing 12. The supervisory control system could then wirelessly communicate with the tool housing 12 to grant permission for the motor 14 to operate, which may be based at least in part on the supervisory control system receiving the wireless signal from the second handle 26 indicating that the second switch 38 has been pressed.

While preferred embodiments of the inventions have been described, it should be understood that the inventions are not so limited, and modifications may be made without departing from the inventions herein. While each embodiment described herein may refer only to certain features and may not specifically refer to every feature described with respect to other embodiments, it should be recognized that the features described herein are interchangeable unless described otherwise, even where no reference is made to a specific feature. It should also be understood that the advantages described above are not necessarily the only advantages of the inventions, and it is not necessarily expected that all of the described advantages will be achieved with every embodiment of the inventions. The scope of the inventions is defined by the appended claims, and all devices and methods that come within the meaning of the claims, either literally or by equivalence, are intended to be embraced therein.

The invention claimed is:

1. An electric tool, comprising:
an electric motor disposed within a tool housing, the electric motor configured to supply a torque;
a torque multiplier coupled to the electric motor for increasing the torque to a final output torque, the final output torque for tightening a fastener;
a reaction arm coupled to the torque multiplier for bracing the electric tool against a workpiece while the fastener is tightened by the final output torque;
a first handle graspable by one hand of an operator, the first handle connected to the tool housing;
a first trigger switch disposed on the first handle;
a second handle graspable by another hand of the operator, the second handle connected to the tool housing, the second handle located between the first handle and the reaction arm;
a second trigger switch disposed on the second handle;
a wireless transmitter disposed on the second handle and coupled to the second trigger switch, the wireless transmitter transmitting a first wireless signal when the second trigger switch is pressed;
a wireless receiver disposed on the tool housing; and
a controller coupled to the first trigger switch and the wireless receiver,
wherein the controller enables the electric motor only while the first trigger switch is pressed and while either the wireless receiver receives the first wireless signal or a second wireless signal from a supervisory control system indicating the second trigger switch is pressed to prevent the operator from contacting the reaction arm with either of the one hand or the other hand while the controller enables the electric motor.

2. The electric tool according to claim 1, further comprising an output drive, wherein the output drive and the reaction arm are rotatable relative to each other.

3. The electric tool according to claim 1, wherein the second handle is rotatable relative to the tool housing.

4. The electric tool according to claim 1, wherein the second handle is removable from the tool housing.

5. The electric tool according to claim 1, wherein the wireless transmitter and the wireless receiver transmit and receive at a frequency of 433 MHz.

6. The electric tool according to claim 1, wherein a power level of the wireless transmitter limits a distance of the first wireless signal to less than 10 feet.

7. The electric tool according to claim 1, further comprising a second antenna coupled to the wireless receiver, the second antenna being solely a trace on a printed circuit board without a separate physical antenna.

8. The electric tool according to claim 1, further comprising a battery powering the wireless transmitter, the battery being a coin cell battery.

9. The electric tool according to claim 1, wherein the second handle comprises a battery access door and a spare battery within the second handle.

10. The electric tool according to claim 1, wherein the first trigger switch and the wireless receiver are wired to the controller.

11. The electric tool according to claim 1, further comprising a mode switch, the mode switch allowing the controller to enable the electric motor while the first trigger switch is pressed without the wireless receiver receiving the first wireless signal or the second wireless signal indicating the second trigger switch is pressed.

12. The electric tool according to claim 1, wherein the controller enables the electric motor while the first trigger switch is pressed and the wireless receiver receives the first wireless signal from the wireless transmitter of the second handle.

13. The electric tool according to claim 1, wherein the controller enables the electric motor while the first trigger switch is pressed and the wireless receiver receives the second wireless signal from the supervisory control system, the second wireless signal being transmitted in response to the supervisory control system receiving the first wireless signal from the wireless transmitter of the second handle in conjunction with permission being granted by the supervisory control system to operate.

14. The electric tool according to claim 1, wherein the controller enables the electric motor while the first trigger switch is pressed and the wireless receiver receives the first wireless signal from the wireless transmitter of the second handle in conjunction with receiving the second wireless signal from the supervisory control system granting permission to operate.

15. The electric tool according to claim 1, wherein the second trigger switch comprises a hinged lever on the second handle, the hinged lever being squeezed by the operator's another hand to press the second trigger switch.

16. The electric tool according to claim 1, further comprising a light coupled to the second trigger switch, the light being illuminated while the second trigger switch is pressed.

17. The electric tool according to claim 1, further comprising a light coupled to the second trigger switch, the light being illuminated when the second trigger switch is operationally functional.

18. The electric tool according to claim 1, wherein the wireless transmitter is disposed within the second handle and the wireless receiver is disposed within the tool housing, the second handle being separate from but connectable to the tool housing and the first handle being a portion of the tool housing.

19. An electric tool, comprising:
an electric motor disposed within a tool housing, the electric motor configured to supply a torque;
a torque multiplier coupled to the electric motor for increasing the torque to a final output torque, the final output torque for tightening a fastener;
a reaction arm coupled to the torque multiplier for bracing the electric tool against a workpiece while the fastener is tightened by the final output torque;
a first handle graspable by one hand of an operator, the first handle connected to the tool housing;
a first trigger switch disposed on the first handle;
a second handle graspable by another hand of the operator, the second handle connected to the tool housing, the second handle located between the first handle and the reaction arm, the second handle including a battery access and a battery within the second handle;
a second trigger switch disposed on the second handle;
a wireless transmitter disposed on the second handle and coupled to the second trigger switch, the wireless transmitter transmitting a first wireless signal when the second trigger switch is pressed;
a wireless receiver disposed on the tool housing; and
a controller coupled to the first trigger switch and the wireless receiver,
wherein the controller enables the electric motor only while the first trigger switch is pressed and while either the wireless receiver receives the first wireless signal or a second wireless signal from a supervisory control system indicating the second trigger switch is pressed to prevent the operator from contacting the reaction arm with either of the one hand or the other hand while the controller enables the electric motor.

20. An electric tool, comprising:
an electric motor disposed within a tool housing, the electric motor configured to supply a torque;
a torque multiplier coupled to the electric motor for increasing the torque to a final output torque, the final output torque for tightening a fastener;
a reaction arm coupled to the torque multiplier for bracing the electric tool against a workpiece while the fastener is tightened by the final output torque;
a first handle graspable by one hand of an operator, the first handle connected to the tool housing;
a first trigger switch disposed on the first handle;
a second handle graspable by another hand of the operator, the second handle connected to the tool housing, the second handle located between the first handle and the reaction arm;
a second trigger switch disposed on the second handle;
a wireless transmitter disposed on the second handle and coupled to the second trigger switch, the wireless transmitter transmitting a first wireless signal when the second trigger switch is pressed;
a wireless receiver disposed on the tool housing; and
a controller coupled to the first trigger switch and the wireless receiver,
wherein the controller enables the electric motor only while the first trigger switch is pressed, the wireless receiver receives the first wireless signal, and the wireless receiver receives the second wireless signal from the supervisory control system granting permission to operate, to prevent the operator from contacting the reaction arm with either of the one hand or the other hand while the controller enables the electric motor.

21. The electric tool according to claim 20, wherein the second wireless signal is transmitted in response to the supervisory control system receiving the first wireless signal from the wireless transmitter.

* * * * *